Patented Sept. 1, 1931

1,821,095

UNITED STATES PATENT OFFICE

MORTIMER T. HARVEY, OF EAST ORANGE, NEW JERSEY, ASSIGNOR TO THE HARVEL CORPORATION, OF NEWARK, NEW JERSEY, A CORPORATION OF NEW JERSEY

COMPOSITION AND METHOD OF MAKING THE SAME

No Drawing.    Application filed February 19, 1929.   Serial No. 341,271.

The present invention relates to materials and processes for making them, in which cashew nut shell liquid is employed. The invention relates more particularly to materials and processes involving the use of cashew nut shell liquid and an aldehyde with or without the use therewith of a drying oil or oils, such as linseed oil or tung oil, fish oil or other equivalent oils, and in each case with or without a drying agent or accelerator or catalyst.

It is an object of the invention to produce from cashew nut shell liquid and other materials, products for coatings, impregnations, paints, varnishes, molded compositions, for use in the paint industry, in electrical insulation, in molded articles and for use in the art generally.

It is another object of the invention to provide a liquid coating material which will dry at normal temperatures within a few hours.

Other objects and advantages of the invention will appear from the following specification in which the processes, methods, steps and materials of the invention are fully described, and the invention also consists in the various methods and materials set forth in the appended claims.

Primarily the method of the invention comprises bringing cashew nut shell liquid and an aldehyde, preferably formaldehyde, together to produce reaction products and materials having characteristics and properties hereinafter set forth.

The invention herein claimed differentiates from those claimed in applicant's Patents Numbers 1,725,794; 1,725,795; and 1,725,797, all issued August 27, 1929, and all copending herewith, in that the cashew nut shell liquid is heat treated to initiate a reactive condition therein, and thereafter the heat treated cashew nut shell liquid is subjected to the action of formaldehyde, whereby the reaction may be facilitated. This differentiates from the inventions claimed in Patent 1,725,794 in that in the latter, reaction with an aldehyde is not specifically claimed; and differentiates from the inventions claimed in Patents 1,725,795 and 1,725,797 in that in the latter, pretreatment with heat before subjection to reaction with an aldehyde is not specifically claimed. Advantages are secured by this pretreatment with heat before the aldehyde reaction not present when the preheating step is not performed.

According to the invention the cashew nut shell liquid and formaldehyde can be reacted with each other under different conditions of temperature and pressure, and in each case with or without the influence of other materials such as driers or catalysts. Examples of the catalysts, driers, or eccelerators suitable for this purpose are acid gums such as, for example, as manganese resinate, rosin, and the like; acids, for example, nitric acid, hydrochloric acid; alkali, for example, ammonia, lime, soda, baria, and so on; oxygen containing metal compounds other than those included in the above examples, for example, copper oleate, copper carbonate, copper ammonium sulphate, copper ammonium hydroxide, lead oxide, and so on; also metals such as copper, nickel and so on; and the nitric acid or the manganese resinate can be classified as an acid oxidizing agent. Hereinafter the catalytic materials or driers above mentioned will be referred to by the generic term, accelerators, because they are employed to initiate or aid in the drying or setting of the cashew nut shell liquid or products made therewith, or in producing the drying characteristic in cashew nut shell liquid. In preparing products of this invention for use in the practical arts commercial cashew nut shell liquid is used, and this is secured as a by-product of the cashew nut kernel, the shell being burned or charred over an open fire so that it can be removed by hand from the kernel, the shell liquid being caught as it drips or flows from the opened shell.

In the practice of this invention the aldehydes suitable are formaldehyde, paraform, acetaldehyde, paraldehyde, benzaldehyde, furfuraldehyde and other well known compounds comprising the aldehyde group of atoms. Also, formaldehyde producing or generating materials such as hexamethylenetetramine can be used in a reaction with the cashew nut shell liquid, the latter either raw or heat treated. In the claims, the term "reacting with formaldehyde", or similar term, is intended to cover any of these materials. The preferred aldehyde is formaldehyde and this can be used in its various forms, namely; in the gaseous form; in solution in water, the commercial forty per cent solution in water being suitable; and in the polymerized form called metaformaldehyde or paraform. The formaldehyde gas can be passed through a body of the cashew nut shell liquid; the water solution thereof can be mixed with the cashew nut shell liquid; and the metaformaldehyde can be mixed with the cashew nut shell liquid. In the use of the different aldehydes and of different forms of a given aldehyde the reaction with the cashew nut shell liquid can take place at different temperatures ranging from normal temperatures upwardly to points as high as 600° to 700° C. or more. When water solution of formaldehyde is used, for some purposes the reaction is carried on at about 125° to 135° C. but the reaction can be brought about at temperatures above or below. The fact that formaldehyde passes as a gas from its water solution at above 95° C. is, in some cases, an influencing factor in determining the temperature at which the reaction is brought about, and in some cases the reaction is carried under a reflux condenser to return vaporized formaldehyde by means of condensed water vapor which catches the formaldehyde vapor and carries it back. And recourse can be had to other and various expedients well known in the practice of the sciences of chemistry and physics to adapt the particular processes used to the nature of the various aldehydes and aldehyde compounds employed in the practice of this invention.

The paraform or metaformaldehyde is soluble in cashew nut shell liquid in both the solid form and in the melted or liquid form, and can be used therewith for purposes for which formaldehyde is used. The paraform will react with cashew nut shell liquid at normal or room temperature but the time of reaction can be decreased by heating, for example, at about 90° C. to 120° C., and at other temperatures above and below this range. The time of heating is suited to the particular application to which the material to be prepared is to be put.

Below is a tabulation of relations and conditions showing generally, but not limiting, the manner in which cashew nut shell liquid and water solutions of formaldehyde can be brought together; and the other forms of formaldehyde, the gaseous form and the paraform as well as the other aldehydes and also formaldehyde producing or generating materials such as hexamethylenetetramine can be used generally in the same manner. In the following table cashew nut shell liquid is referred to as cashew liquid.

(1) Raw cashew liquid and formaldehyde at normal temperature.
(2) Cooked cashew liquid and formaldehyde at normal temperature.
(3) Raw cashew liquid, formaldehyde and drier at normal temperature.
(4) Cooked cashew liquid, formaldehyde and drier at normal temperature.
(5) Raw cashew liquid and formaldehyde, heated.
(6) Cooked cashew liquid and formaldehyde, heated.
(7) Raw cashew liquid and formaldehyde heated, and drier added.
(8) Raw cashew liquid, formaldehyde and drier, heated.
(9) Cooked cashew liquid, formaldehyde, heated and drier added.
(10) Cooked cashew liquid, formaldehyde, and drier heated.

Other variations in the method steps can be used to suit conditions and requirements. The driers can be those hereinabove cited, and the time and temperatures of "cooking" and "heating" can be varied; for example, the "cooking" can be at 450° F. for two hours, or the cashew liquid can be raised to 600° F. and then immediately permitted to cool. The "heating" of the mixture of cashew liquid and formaldehyde, with or without other ingredients, can be at 190° to 250° F. for two hours, for example. But since the reaction will take place comparatively slowly at room temperature it will be apparent that the time and temperature of heating can be varied to suit conditions and requirements. The length of time of drying of the prepared material depends on the history of its treatment and on the ingredients and proportions thereof and also on the temperature at which drying is carried on. The prepared materials which have been made at normal or room temperature require longer for drying but some of those prepared with the use of heat will dry at room temperature in twenty-four hours, and at about 100° C. in from one-half to two hours. Examples of time and temperature for drying will be given hereinafter with detailed description of the making of illustrative examples of the invention.

It is to be understood in this description of the invention that while commercial cashew nut shell liquid is cited, said liquid secured in other ways than those described can be used such for example as by opening the shell mechanically and then removing the shell liquid, because the commercial liquid has essential characteristics which are neither lost nor received during the removal by charring the shell. For example, the commercial liquid, like the liquor from mechanically opened shells, will stand for years exposed to the air without drying or forming a film.

It is to be further noted that the incorporation of formaldehyde in cashew nut shell coatings, molded compositions, and so on, the chemical resistance electrical insulation characteristics are bettered very much even when very small quantities are used. For example, four mil kraft paper impregnated and coated with cashew nut shell liquid varnish of a given kind to five to six mil total thickness has a puncture test of fifteen hundred volts per mil thickness of the varnished paper, whereas in a similar varnished paper in which a like cashew nut shell liquid varnish has incorporated therewith formaldehyde in amount eight-tenths of one per cent the puncture test is raised to eighteen hundred volts per mil.

Likewise the resistance to solubility in acids, alkalis, alcohol, benzol, gasoline and other materials and chemicals is appreciably increased by the incorporation of formaldehyde in the cashew nut shell varnish, or other preparation.

In making molded compositions the cashew nut shell liquid preparations can be used in the liquid form, or in jelly or gum form. The jellies and gums are secured by heating the preparation for greater periods or at higher temperatures than are the liquid preparation and/or by using greater percentages of formaldehyde.

One general method of the invention comprises heating commercial cashew nut shell liquid up to a temperature of about 600° F. and then cooling or permitting it to cool and mixing formaldehyde therewith to produce a product which is a modification of the cashew nut shell liquid. The heat can be carried higher than 610° F., for example as high as 850° F., and the heating can also be at lower temperatures than 600° F. The formaldehyde is added to the heat treated cashew nut shell liquid, preferably at temperatures below the boiling point of water because as is well known formaldehyde leaves the water in which it is applied, at a temperature below 100° C., that is, at about 95° C., the common commercial form of formaldehyde being a 40% solution in water. In the preparation of this general example of the material of the invention of the heat treated cashew nut shell liquid is supplied with a solvent vehicle such as varnoline or other well-known solvent vehicles to adapt said liquid to be applied as a coating and the formaldehyde is added after the addition of the vehicle because then it can be thoroughly and completely intermixed in the cashew nut shell liquid than when the latter is in the uncut stage. The formaldehyde can be intermixed with the cut cashew nut shell liquid at room temperature after which the temperature is raised to produce or facilitate a reaction between the treated cashew nut shell liquid. The formaldehyde can also be added to the heat treated cashew nut shell liquid as it cools and before it has reached room temperature, the solvent, when it is added before the formaldehyde, being also added before the liquid reaches room temperature. As stated before, the temperature at the time the formaldehyde is added is preferably, below the boiling point of water and below the temperature at which the formaldehyde leaves its water solvent. After the formaldehyde is added to the heat treated cashew nut shell liquid and stirred thereinto, the mixture is brought up to a temperature about 280° to 300° F. or other suitable temperatures depending on the solvent used, and so on, to drive off the water carried thereby, care being taken to prevent excessive evaporation of volatilization of the formaldehyde from the mixture. The rate of reaction of formaldehyde with the treated cashew nut shell liquid is rapid enough to prevent loss of excessive amounts of the formaldehyde when the temperature is raised to drive off water, and to permit a single heating with continuous raising temperature to suffice both for accelerating the reaction and for driving off water.

The resulting product of the heat treated cashew nut shell liquid and formaldehyde varies in consistency from a comparatively fluent liquid to a viscous mass depending upon the proportion of formaldehyde to the treated cashew nut shell liquid. When about 2% by volume of a 40% water solution of formaldehyde is mixed with the heat treated cashew nut shell liquid the product is fluent; but when about 4% or more is used instead of about 2% or less the product is heavy and gummy. For making liquid material such as for varnishes and paints, electrical coil impregnating liquids, and the like, about 0.2% to 2% formaldehyde is used. The gummy material is suitable for making heavy impregnations and molded compositions.

Driers or accelerators can be used in this example of the invention and are useful therein to hasten drying or setting thereof. Some of the driers and accelerators useful for this purpose are, for example, copper oleate, lead oxide, preferably as litharge, manganese resinate, zinc oxide, and others above cited. The drier can be added at any time before, during, or after the heat treatment of the cashew nut shell liquid and in one method under this general example of the invention the drier is added after the heat treatment and while the temperature is being brought down from upper heat treating temperature. In this particular method the liquid after being brought up to 600° to 610° F. is dropped to 550° to 450° F., at which temperature it is held for about one hour, after which the drier is added and the temperature is then dropped further and solvent and formaldehyde added.

A more specifi example of the process of the invention is given below, in the sequence of its steps, but various modifications can be made in the steps and in the order of their performance in the process:

About 4 parts, by weight, of raw cashew nut shell liquid are heated to about 600° to 610° F. and the heating is discontinued so that the liquid after reaching this temperature will start cooling. With quantities of about fifty to one hundred gallons the temperature can be brought to about 580° F. and the heating discontinued whereupon the temperature will go as high as between 600° to 610° F. and then begin to cool. At the upper temperature, that is about 600° F., one part, by weight, of raw linseed oil is added to the cashew nut shell liquid and intermixed therewith. The cooling mixture is permitted to drop to between 550° and 450° F. and then held there for about one hour, for example, by again applying heat, and at the end of this period driers are added about equal parts each of litharge and manganese resinate, together totaling about 2% in weight of the mixture of cashew nut shell liquid and linseed oil. The preparation is then cooled or permitted to cool to about 300° F. at which temperature an equal amount of varnoline or other solvent is added as a vehicle. The preparation is then permitted to cool to room temperature, as by letting stand overnight after which 1% by volume of a 40% water solution of formaldehyde is added and mixed in. The mixture is then heated up to 280° F. to react the formaldehyde with the preparation and drive off water. The preparation is then cooled or permitted to cool and then is ready for use.

In this example there are about 50% solids in the varnish solution, and the proportion of formaldehyde is approximately 0.5% of the cashew nut shell liquid or 1% of the total. If the amount of formaldehyde used is doubled, then the reaction product of the cashew nut shell liquid and formaldehyde is immediately formed as a jelly.

A further characteristic of these reactions is that the character of the solvent and the "degree of solution" affect, to some extent, the rate or ease of reaction of the cashew nut shell liquid and formaldehyde. There is some indication that there is a loose relation between the solvent and the cashew nut shell liquid because when large proportions of formaldehyde are needed to get a given product with given changing time and temperature characteristics etc.; and likewise, when a solvent is used in which the cashew nut shell liquid is more easily soluble such as naphtha of varnoline, a greater percentage of formaldehyde is needed to get a given product. This means, for example, that with increased proportions of varnoline or when using naphtha instead of varnoline, greater proportions of formaldehyde must be used to get a jelly.

It is to be noted that when no solvent at all is used for the cashew nut shell liquid then jelly is formed immediately with even very small proportions of formaldehyde. Also when proportionate highly diluted solutions of the cashew nut shell liquid in varnoline or other solvent are used then the less the difference in results when the amount of solvent is varied. Also, the greater the amount of heating of the cashew nut shell liquid before or after the formaldehyde is added, the less formaldehyde is needed to get a jelly.

Conversely, when raw cashew nut shell liquid is used comparatively great proportions of formaldehyde can be used without getting a jelly also with the higher proportions of formaldehyde the lower the temperature needed for drying a liquid varnish, for example.

As an example of the difference in character between the raw cashew nut shell liquid and the same liquid heated to 600° F., the following is given, the product being a varnish which will dry in air at room temperature in from five to eight hours. Heat one volume of commercial cashew nut shell liquid at 450° F. and add 2.5 to 5% manganese resinate which dissolves therein and then permit to cool to about 300° F. and add an equal volume of varnoline. Then cool to about 140° F. and add a 40% water solution of formaldehyde, in volume about 10% to 20% of the volume of cashew nut shell liquid used, then raise to about 190° F., preferably under a reflux condenser, and hold for about one to two hours, then, removing the reflux condenser if used, raise to 240° F. to drive off water and any excess formaldehyde. Add another volume of varnoline and permit to cool. The product is a liquid varnish which will dry under above stated conditions and time.

In a variation of this last example, and preheating of the cashew nut shell liquid at 450° F. can be omitted and the product will dry at room temperature in less than ten hours.

In the above method and in other methods of the invention, the linseed oil can be omitted and straight cashew nut shell liquid used, or tung oil, Chinawood or Japan wood oil, fish oil, castor oil or other drying oils can be used. Also, instead of using raw oil, boiled or jellied or blown linseed or tung or fish oil can be used; also the cashew nut shell liquid can be pretreated with heat before being brought up to the high temperature herein cited. Further, the drying oil or oils, whatever used, can be added before or after the cashew nut shell liquid is brought up to the high temperature, or it can be added in lots at different times during the process. An explanation of the process in this regard may be that cashew nut shell liquid is heated to the cited high temperatures in order to modify it to suit it to reaction with small quantities of formaldehyde to produce a usuable product, and the drying oils are added to further modify the cashew nut shell liquid as regards body, texture, finish and so on. It is to be noted in the particular example of linseed oil cashew shell liquid varnish above given that the raw linseed oil when added to the cashew shell liquid at the upper temperatures serves to cool the latter liquid down or at least to absorb some of the heat therefrom.

In modifications of the particular example above given, and in other cases, the formaldehyde can be added to the preparation before it has reached room temperature on cooling from the high temperatures, but in any case control of the effective amount added is attained and loss of formaldehyde by evaporation is prevented by adding the formaldehyde below the temperature of volatilization thereof from its water solution, which temperature is about 95° C. for 40% solution of formaldehyde in water or common commercial formaldehyde.

As an example of a process and product of the invention where no heat is applied during the preparation, the following is given: About 25 parts by volume of cashew nut shell liquid and about 10 parts of a 40% water solution of formaldehyde, and about five parts of concentrated hydrochloric acid are mixed together in about 50 parts of gasoline or other suitable solvent and the mixture is let stand for about forty-eight hours at room temperature. During this time a reaction occurs which produces a small amount of water and a product soluble in the gasoline and two layers are formed, one a top gasoline layer which carries the dissolved reaction product and the other a water layer which carries unreacted acid and to the bottom of which settles reaction products which are not soluble in the gasoline. As the reaction continues the gasoline solution layer thickens in consistency until the reaction agents have substantially all reacted. The gasoline solution is then separated from the water and is preferably washed to remove traces of acid. The solution of reaction product in gasoline made in this manner will dry in from three to five minutes at a temperature of about 104° C., that is the solvent will be driven off and the reaction product will be driven off and the reaction product will be set into a condition in which it is insoluble in gasoline, benzene, benzol, naphtha, alcohol, and other similar solvents, and also insoluble in dilute or concentrated acids or alkalis, and in which it will be unaffected by boiling water.

In the above example of method, the water can be driven off by heating to about 100° C. or more and this heating will affect the reaction product to produce further reaction therein so that the drying time, when applied, is reduced.

In all of the examples described herein the reaction product may be in colloidal suspension in the vehicle or in solution therein or partly in both these phases, and in the claims hereof solution is intended to cover whatever relation there is between the reaction product and the vehicle.

The solvents above cited are generally all volatile solvents but non-volatile solvents can be used, particularly when the material used for the solvent can be left in the product or when it forms a part thereof as by some reaction. For example, cresol, phenol, or resorcinol can be used as solvents to catch the reaction product as it is formed to prevent the formation of the gummy reaction product when comparatively large percentages of formaldehyde are used with the cashew nut shell liquid. These products, namely, phenol, cresol, resorcinol, etc., have the same effect in blanketing or retarding the rate of reaction between cashew nut shell liquid and formaldehyde as does the volatile solvents as above pointed out. It is pertinent however that phenol, cresol, and resorcinol react with the cashew nut shell liquid and formaldehyde to form distinctive products and can be used even when minor quantities of formaldehyde are used and when solvent per se can be omitted.

In one example of method and product using phenol, formaldehyde and cashew nut shell liquid equal parts by weight of these materials are mixed together (the phenol being commercial crystals, and the formaldehyde being a 40% solution in water) and heated to about 330° F. and allowed to cool. The resulting product cut with a vehicle, varnoline, for example, when applied as a coating to paper and varied at 250° F. gave a hardened somewhat flexible film.

In another example, to equal parts of cashew nut above described, about 3% of a 28% ammonia solution was added and the mixture brought up to 330° F. and allowed to cool. The product was hard and brittle, could be powdered and was fusible, but on heating for about one-half to three-quarters of hour became infusible. This material is suitable among other purposes, for making molded compositions and impregnations.

Cashew nut shell liquid formaldehyde products can be used with phenol formaldehyde condensation products to make products which have the general characteristics of cashew nut shell liquid products and phenol formaldehyde condensation products and which have a degree of flexibility and pliability not before obtained with phenol-formaldehyde condensation products; and drying oils, such as those above cited can be used to increase pliability and give body and so on to the final product. In this class of products formaldehyde from the phenol-formaldehyde condensation product can be utilized for reaction with the cashew nut shell liquid with or without the addition of other formaldehyde.

In all or most of the general and specific examples above given variation can be made to put the cashew nut shell liquid, formaldehyde, drier, and solvent (and drying oil when used) all together at the same time to get products suitable for particular purposes and uses.

A great advantage, among others, of the cashew nut shell liquid-formaldehyde products of this invention, with or without drying oil or oils, is that in drying a coagulation and hardening takes place uniformly throughout the mass of the products. This is of prime importance in the impregnation of electric coils with products of this invention because the impregnation will dry or set uniformly throughout the body of the coils even though the inner parts have no exposure to the air. The drying or setting reaction is in the nature of the catalytic and the results seem to indicate that the products of the drying reaction formed at the surface influence the inner parts within infinitesimal periods of time to produce a uniform product entirely throughout the mass. This is in contrasting distinction from the nature of drying oils, such as linseed oil, tung oil and so on and their products, in setting, in which class of materials drying or setting takes place slowly, beginning at the surface and absorbing enormous quantities of oxygen, and in which films formed at the outer surfaces hinder the passage of oxygen inwardly and retard the drying or setting of the inner portions so that in cases where the mass is of a little extent, as in electrical coils, the inner portions remain in the liquid state for long periods of time after the coils have been put in use, in some cases for months and years, even though heat has been applied in an effort to aid setting or drying. In the use of the products of this invention the insulation value and the binding and cementing of the coils together is secured immediately and usually before the coils are put to use.

Coatings, impregnations, molded compositions, and so on, prepared according to the example processes described above have a high degree of resistance to acids, alkalis, and to common solvents such as varnoline, gasoline, alcohol, benzine, and so on, and have high dielectric strength.

I claim:

1. In the process of preparing a product from cashew nut shell liquid and formaldehyde, the step which consists in pretreating the cashew nut shell liquid with heat before said liquid and the formaldehyde are brought together.

2. The method which comprises heating cashew nut shell liquid and then reacting it with an aldehyde.

3. The method which comprises heating cashew nut shell liquid and then submitting it to the action of formaldehyde.

4. The method which comprises heating cashew nut shell liquid and then reacting it with formaldehyde in contact with an accelerator.

5. In the method of getting a reaction product of cashew nut shell liquid and formaldehyde into solution, which product passes through a soluble state during the producing reaction to an insoluble state, and which method comprises bringing the reaction agents together in a material which is a solvent for the reaction product in the soluble state; the step which comprises heating the cashew nut shell liquid above 500° F. before said liquid and formaldehyde are brought together.

6. In the method of getting a reaction product of cashew nut shell liquid and formaldehyde into solution, which product passes through a soluble state during the producing reaction to an insoluble state, and which method comprises bringing the reaction agents together in a material which is a solvent for the reaction product in the soluble state; the step which comprises heating the cashew nut shell liquid to about 600° F. before said liquid and formaldehyde are brought together.

7. A composition of matter obtained by heating cashew nut shell liquid, and then subjecting the heat treated liquid to the action of formaldehyde in a solvent for an intermediate reaction product of said materials.

8. A composition of matter obtained by heating cashew nut shell liquids above 450° F., and then reacting the heat treated liquid with formaldehyde in a solvent for a reaction product of said materials.

9. A composition of matter obtained by heating cashew nut shell liquids above 550° F., and then reacting the heat treated liquid with formaldehyde in a solvent for a reaction product of said materials.

10. The method which comprises heating cashew nut shell liquid to about 600° F. to initiate a drying condition, lowering the temperature to about 550° to 450° F. and thereat adding an accelerator, holding at this temperature for a period to further affect a drying condition in said liquid, lowering the temperature and adding a solvent vehicle at a suitable temperature, adding a water solution of formaldehyde at a temperature below that at which the formaldehyde vaporizes from the preparation, and then raising the temperature to insure fixing of the formaldehyde in the preparation and to drive off water therefrom.

11. The method which comprises heating cashew nut shell liquid to initiate a drying condition therein, adding a drier or accelerator and adding a solvent, subsequently adding a water solution of formaldehyde at a temperature below that at which the formaldehyde vaporizes from the preparation, and heating to insure fixing of the formaldehyde and to drive off water.

12. The method of claim 11, characterized by that a natural drying oil is incorporated in the preparation.

13. The method which comprises heating cashew nut shell liquid above 400° F and subsequently subjecting to reaction with formaldehyde.

14. The method which comprises heating cashew nut shell liquid; adding a drier; adding a water solution of formaldehyde, the latter being added in the presence of a solvent for a reaction product of these materials; and employing heat to drive off water.

15. In the method of getting a reaction product of cashew nut shell liquid and formaldehyde into solution, which product passes through a soluble state during the producing reaction to an insoluble state, and which method comprises bringing the reaction agents together in a material which is a solvent for the reaction product in the soluble state; the step which comprises heating the cashew nut shell liquid before said liquid and formaldehyde are brought together.

16. The method which comprises heating cashew nut shell liquid; adding an accelerator; adding a water solution of formaldehyde at a temperature below 220° F., and subsequently raising the temperature to drive off moisture.

17. A composition of matter obtained by heating cashew nut shell liquid to change it from its natural nondrying condition and subsequently subjecting it to the reaction of formaldehyde.

In testimony that I claim the invention set forth above I have hereunto set my hand.

MORTIMER T. HARVEY.